United States Patent
Ktenas et al.

(10) Patent No.: US 8,649,273 B2
(45) Date of Patent: Feb. 11, 2014

(54) METHOD FOR REPORTING A TRANSMISSION CHANNEL QUALITY

(75) Inventors: Dimitri Ktenas, Fontaine (FR); Emilio Calvanese Strinati, Grenoble (FR)

(73) Assignee: Commissariat a l'energie atomique et aux energies alternatives, Paris (FR)

(*) Notice: Subject to any disclaimer, the term of this patent is extended or adjusted under 35 U.S.C. 154(b) by 140 days.

(21) Appl. No.: 13/203,572

(22) PCT Filed: Feb. 26, 2010

(86) PCT No.: PCT/EP2010/052458
§ 371 (c)(1), (2), (4) Date: Sep. 22, 2011

(87) PCT Pub. No.: WO2010/097455
PCT Pub. Date: Sep. 2, 2010

(65) Prior Publication Data
US 2012/0008698 A1    Jan. 12, 2012

(30) Foreign Application Priority Data
Feb. 27, 2009  (FR) .................................... 09 51278

(51) Int. Cl.
*G01R 31/08*  (2006.01)

(52) U.S. Cl.
USPC ......................................... 370/241; 370/226

(58) Field of Classification Search
None
See application file for complete search history.

(56) References Cited

U.S. PATENT DOCUMENTS

| 7,542,514 | B2* | 6/2009 | Song et al. ............. 375/260 |
| 8,111,624 | B2* | 2/2012 | Calvanese Strinati ........ 370/241 |
| 2004/0264588 | A1* | 12/2004 | Song et al. ............. 375/260 |
| 2008/0219219 | A1 | 9/2008 | Sartori et al. |
| 2009/0209261 | A1 | 8/2009 | Kuri et al. |
| 2010/0015923 | A1 | 1/2010 | Golitschek |
| 2011/0273981 | A1* | 11/2011 | Ktenas et al. ............. 370/226 |

FOREIGN PATENT DOCUMENTS

| EP | 1 901 573 A1 | 3/2008 |
| EP | 1 906 577 A1 | 4/2008 |
| WO | WO 2008/109269 A2 | 9/2008 |

OTHER PUBLICATIONS

International Search Report issued Jul. 12, 2010 in patent application No. PCT/EP2010/052458.
Na Wei, et al., "Mitigating Signaling Requirements for MIMO with Frequency Domain Packet Scheduling", Vehicular Technology Conference, IEEE, XP31093135A, 2007, pp. 2771-2775.
Texas Instruments, "CQI Feedback Reduction Scheme for E-UTRA", $3^{RD}$ Generation Partnership Project (3GPP), vol. RAN WG1, XP50106533A, Jun. 25-29, 2007, pp. 1-7.

(Continued)

Primary Examiner — Robert Wilson
(74) Attorney, Agent, or Firm — Oblon, Spivak, McClelland, Maier & Neustadt, L.L.P.

(57) ABSTRACT

A method for reporting a user channel quality in a wireless telecommunication system. The user channel includes a plurality of transmission resources such as, for example, frequency intervals of an OFDM multiplex. The user terminal determines the transmission resources which would be in an outage position for a transmission with a set point bit rate. The user terminal transmits on the uplink the list of resources which would be in an outage position as well as a channel quality indicator for resources which would not be.

14 Claims, 5 Drawing Sheets

(56) References Cited

OTHER PUBLICATIONS

Emilio Calvanese Strinati, et al., "Performance Evaluation of Some Hybrid ARQ Schemes in IEEE 802.11a Networks", Proceedings of the IEEE Vehicular Technology Conference, vol. 4, Apr. 2003, 5 pages.

Niko Kolehmainen, et al., "Channel Quality Indication Reporting Schemes for UTRAN Long Term Evolution Downlink", Proceedings of the IEEE Vehicular Technology Conference, May 2008, pp. 2522-2526.

Ezio Biglieri, et al., "Fading Channels: Information-Theoretic and Communications Aspects", IEEE Trans. On Information Theory, vol. 44, No. 6, Oct. 1998, pp. 2619-2692.

3GPP TR 25.892, "Feasability Study for OFDM for UTRAN Enhancement", Jun. 2004, pp. 1-95.

N. Maeda, et al., "Experimental Evaluation of Throughput Performance in Broadband Packet Wireless Access Based on VSF-OFCDM and VSF-CDMA", IEEE PIRMC, 2003, pp. 6-10.

\* cited by examiner

METHOD FOR REPORTING A TRANSMISSION CHANNEL QUALITY

TECHNICAL FIELD

The present invention generally relates to the field of wireless telecommunication systems and more particularly to those making use of a link adaptation.

STATE OF THE PRIOR ART

In a wireless telecommunication system, the quality of a signal received by a terminal depends on a great number of factors. In order to maximize the transmission rate and the global system capacity, the characteristics of the signal to be transmitted may be modified to take account of variations in the transmission channel quality. This modification mechanism is known as link adaptation.

A well known means to adapt a link in a wireless telecommunication system is to use adaptive modulation and coding (AMC), in other words to select a modulation and coding scheme (MCS) depending on the channel quality. This means is in particular implemented in the physical layer of 3GPP HSxPA and ETSI HIPERLAN/2 systems. Typically, for a low signal to noise ratio on the transmission channel, a code with a low grade (that is a high redundancy rate) and/or with a low modulation degree (that is a low size constellation) is selected. On the contrary, if the transmission channel has a high signal to noise ratio, the rate is maximised by selecting a high grade code and a high modulation degree. The signal to noise ratio (SNR) or signal to interference plus noise ratio (SINR) is generally assessed by the receiver using pilot symbols and an assessment of propagation coefficients of the channel.

A second means for adapting a wireless link, enabling to cope with fadings on the transmission channel is to use a hybrid automatic repeat request (HARQ): if the receiver receives an erroneous packet, a negative acknowledgment is sent back to the transmitter and the packet is retransmitted. There are different types of HARQ protocol, according to whether the packet is retransmitted as such or further parity bits are only transmitted (incremental redundancy).

The adaptation scheme AMC at the physical layer can be combined with a HARQ mechanism at the data link layer. In that case, this is called cross-layer adaptation mechanism (cross-layer design). In such a case, a first adaptation is performed at the physical layer thanks to selecting the MCS scheme depending on the SINR measured by the receiver to achieve a given target error rate. A second, finer, adaptation is performed at the link layer by sending retransmission requests. The cross-layer architecture enables the number of MCS schemes of the adaptation mechanism AMC to be reduced. One exemplary cross-layer adaptation is found in the paper of E. Calvanese Strinati et al. entitled "Performance evaluation of some hybrid ARQ schemes in IEEE 802.11a networks" published in *Proceedings of the IEEE Vehicular Technology Conference, Spring*, vol. 4, pages 2735-2739, April 2003.

In a multi-access telecommunication system, the link adaptation occurs after transmission resources have been allocated to a user. These may be transmission intervals, transmission frequencies, access codes or even a combination of such resources. The resource allocation, also called scheduling enables users, and more generally services requiring a higher quality of service, to benefit from transmission channels with a higher quality.

For example, in an OFDMA (Orthogonal Frequency Division Multi-Access) type wireless transmission system, MCI (Max C/I per chunk scheduling), PF (Proportional Fair per chunk scheduling) or EDF (Earliest Deadline First scheduling) scheduling methods can be used for dynamically allocating frequency intervals (chunks) to the different users. The MCI method aims at maximising the total transmission rate, regardless of quality of service constraints from the different users, by assigning a frequency interval to the user that can achieve the highest instantaneous rate on this interval. The PF method assigns a frequency interval to the user achieving the highest instantaneous rate/average rate ratio on this interval. The EDF method gives priority to real time flows by allocating frequency intervals in priority to packets having the lowest residual TTL (Time To Live) values, regardless of rates the users can achieve.

Once the frequency intervals have been allocated to different users, each user link can be adapted by selecting the modulation and coding scheme which is the most suitable for the transmission channel of the user.

Generally, allocating transmission resources to a user and adapting its downlink requires a feedback on its uplink of a channel quality indicator (CQI).

In practice, in an OFDMA system, the CQI indicator is determined the following way.

In a first step, the transmitter transmits on the downlink a set of pilot symbols on different subcarriers of the OFDM multiplex.

The band of the OFDM multiplex is divided into consecutive frequency intervals $PRB_k$, k=1, . . . , K.

In a second step, at the receiver, for each interval $PRB_k$, k=1, . . . , K or more generally, for each sub-band consisting of $N_{SB}$ adjacent intervals where $N_{SB}$ is a divisor of K, $1 \leq N_{SB} < K$, the signal to interference plus noise ratio SINR(k) is calculated. The ratio SINR(k) is calculated from the power of the received pilot symbols and the power of the noise plus interference summed on the $n_c$ subcarriers of the sub-band and on the number $n_t$ of OFDM symbols during which time they are transmitted, that is:

$$SINR(k) = \frac{1}{n_t n_c} \sum_{j=1}^{n_t} \sum_{i=1}^{n_c} \gamma_{i,j} \quad (1)$$

where $$\gamma_{i,j} = \frac{|h_{i,j}|^2}{\sigma^2}$$

is the signal to interference plus noise ratio per subcarrier relating to the OFDM j symbol, $h_{i,j}$ is the complex attenuation coefficient relating to the subcarrier i=1, . . . , $n_c$ of the OFDM symbol j=1, . . . , $n_t$ and where $\sigma^2$ is equal to the power of the noise plus interference per subcarrier. The number of carriers in the considered sub-band is noted $n_c$ and the number of consecutive OFDM symbols on which the measurement is carried out is noted $n_t$.

In a third step, The SINR(k) ratios, k=1, . . . , $K/N_{SB}$, are converted into a channel quality indicator. The quality indicator CQI can be considered as a vector of the size $K/N_{SB}$ the components CQI(k) of which indicate the transmission quality in the different sub-bands, for example:

$$CQI(k) = C \cdot \text{floor}\left(\frac{SINR(k)}{C} + 0.5\right) \quad (2)$$

where C is the quantization pitch of the quality indicator, SINR(k) is expressed in dB and floor(x) is the function which gives the integer value of x.

Alternatively, each component CQI(k) gives the constellation index MCS enabling to ensure a target packet error rate, $PER_{tg}$, on the downlink, given the SINR(k) ratio in the sub-band considered. It will be assumed in the following that the constellation index is as weak as the constellation is robust to noise.

Finally, in a fourth step, the channel quality indicator is transmitted on an uplink according to a reporting method (CQI reporting scheme). The comprehensive reporting method is that of transmitting all the components CQI(k) of the indicator. However, since the ratio must be frequently sent to follow the quick variations in the channel in mobile telephony, abbreviated reporting methods have been provided. Some of them will be found in particular in a description in the article of N. Kolehmainen et al. entitled "Channel quality indication reporting schemes for UTRAN long term evolution downlink" published in Proceedings of IEEE VTC Spring 2008, Singapore, May 2008, pages 2522-2526.

A first abbreviated reporting method known as "Top-M individual reporting scheme" is that of only transmitting the $M<K/N_{SB}$ components CQI(k) of the indicator having the highest values, the remaining $K/N_{SB}-M$ components being collectively transmitted as a mere average. In other words, only components relating to the $M<K/N_{SB}$ best frequency intervals are individually transmitted, the other being averaged. In this case, the quality indicator can be coded with the following number of bits:

$$R_1 = \log_2\left(C^M_{\frac{K}{N_{SB}}}\right) + L(M+1) \quad (3)$$

where $$C^M_{\frac{K}{N_{SB}}}$$

is the number of combinations of M from $$\frac{K}{N_{SB}}$$

and L the dynamic range allowed for CQI(k) values. The first term corresponds to possible positions of the sub-bands from $K/N_{SB}$ possible sub-bands and the second term corresponds to the number of bits required for coding individual components and the average of the remaining components.

A second abbreviated reporting method, known as "Top-M average reporting scheme" is that of transmitting the M highest components as a first average and the $K/N_{SB}-M$ remaining components as a second average. In this case, the quality indicator can be coded with the following number of bits:

$$R_1 = 2L + \log_2\left(C^M_{\frac{K}{N_{SB}}}\right) \quad (4)$$

A third abbreviated reporting method, known as "Threshold based reporting scheme" is that of selecting the components CQI(k) such as:

$$CQI(k) > CQI_{max} - \eta \quad (5)$$

where $$CQI_{max} = \max_k CQI(k)$$

is the value of the highest component and η is a predetermined threshold value (in dB). The components thus selected are averaged to provide a first average value, and the remaining components are in turn averaged to provide a second average value. The quality indicator, consisting of these two average values as well as the position of sub-bands associated with the components thus selected, needs a number of bits which depends in particular of the threshold value.

Whatever the scheme being chosen, the transmission of the channel quality indicator restricts the bandpass of the uplink, all the more given that the periodicity of this transmission must be short to follow the variations in the channel quality.

WO2008/109269 describes a resource allocation and link adaptation method for different users. The document concerned also provides for reporting a user channel quality (CQI) per group of resources.

A first object of the present invention is consequently to provide a method for reporting a channel quality that penalizes less the bandpass of the uplink than in the state of the art.

A second object of the present invention is to enable a transmission of a channel quality indicator with a higher dynamic range yet without increasing the blocking of the bandpass of the uplink.

A first subsidiary object of the present invention is to enable a transmission on the uplink with a packet error rate and a latency lower than a multi-access telecommunication system of prior art.

A second subsidiary object of the present invention is to reduce the average retransmission number of a packet in a HARQ system and in a correlated manner to increase the average transmission rate (throughput) on downlinks of users.

DISCUSSION OF THE INVENTION

The set point bit rate for a group of resources is advantageously itself deduced from a modulation and coding scheme able to meet a set point packet error rate in the presence of the signal to interference plus noise ratio assessed for this group of resources.

According to one embodiment a method reports a user channel quality in a link adaptation wireless telecommunication system, the channel being of the non ergodic and block fading type and the system having a plurality of groups of transmission resources, each group including at least a transmission resource. For each group of resources, it is determined whether it would be in an outage position for a bit rate required by the user, hereinafter referred to as set point bit rate, a group being considered in an outage position if the instantaneous mutual information on this group of resources is lower than said set point bit rate, and a list of identifiers of groups of resources which would be in an outage position as well as a channel quality indicator for the groups of resources which would not be, are transmitted on the uplink of the user.

Alternatively, the set point bit rate for a group of resources is advantageously deduced from a modulation and coding scheme, said scheme and said signal to interference plus noise ratio being determined together so as to meet a set point packet error rate.

Preferably, the coherence time of the channel is determined, and the list of identifiers of the groups of resources in an outage position is transmitted on the uplink with a period of time equal to higher than said coherence time.

According to a first reporting alternative, the signal to interference plus noise ratio is assessed for each group of resources, and the channel quality indicator comprises quantized values of the signal to interference plus noise ratios relating to the groups of resources which are not in an outage position.

According to a second reporting alternative, the signal to interference plus noise ratio is assessed for each group of resources, said ratios are quantized, the quantized ratios relating to groups of resources not in an outage position being classified depending on their values, the channel quality indicator comprising a predetermined number of quantized ratios having the highest values as well as an average of the remaining values.

According to a third reporting alternative, the signal to interference plus noise ratio is assessed for each group of resources, said ratios are quantized, the quantized ratios relating to groups of resources not in an outage position being classified depending on their values, the channel quality indicator comprising a first average calculated on a predetermined number of the highest values and a second average calculated on the remaining values.

According to a fourth reporting alternative, the signal to interference plus noise ratio is assessed for each group of resources, said ratios are quantized, the quantized ratios relating to the group of resources not in an outage position being classified depending on their values, and a first average is calculated on the values included in an interval the upper bound of which is the highest value and the lower bound of which is the same value minus a predetermined margin, then a second average is calculated on the remaining values, the channel quality indicator including said first and second averages.

Advantageously, when the emitter on said channel receives via the uplink of the user the identifiers of the groups of resources in an outage position, it does not transmit on these groups of resources during a time equal to or higher than the channel coherence time.

Alternatively, when the transmitter on said channel receives via the uplink of the user the identifiers of the groups of resources in an outage position, it does not transmit on these resources during a time equal to or higher than a scheduling period of time for the system resources.

The reporting method according to the invention may be typically implemented in an OFDM telecommunication system. In that case, the transmission resources are frequency intervals of the OFDM multiplex.

The instantaneous mutual piece of information of a frequency interval is then obtained as an average of the mutual information on the subcarriers of said interval.

If the telecommunication system is a redundancy incremental transmission packet telecommunication system, the instantaneous mutual piece of information from two consecutive transmissions of a frequency interval is obtained as twice the average of the mutual information on the subcarriers of said interval.

When the telecommunication system is a HARQ type packet transmission system, wherein a packet is retransmitted as such if the packet received is erroneous, two packets from two consecutive transmissions being combined, the instantaneous mutual piece of information of a frequency interval may then be assessed as the average of the mutual information on the subcarriers of said interval, wherein the noise power is divided by 2 with respect to a single transmission.

BRIEF DESCRIPTION OF THE DRAWINGS

Further characteristics and advantages of the invention will appear upon reading preferable embodiments of the invention in reference to the appended figures wherein.

DETAILED DESCRIPTION OF PARTICULAR EMBODIMENTS

Figure 1:
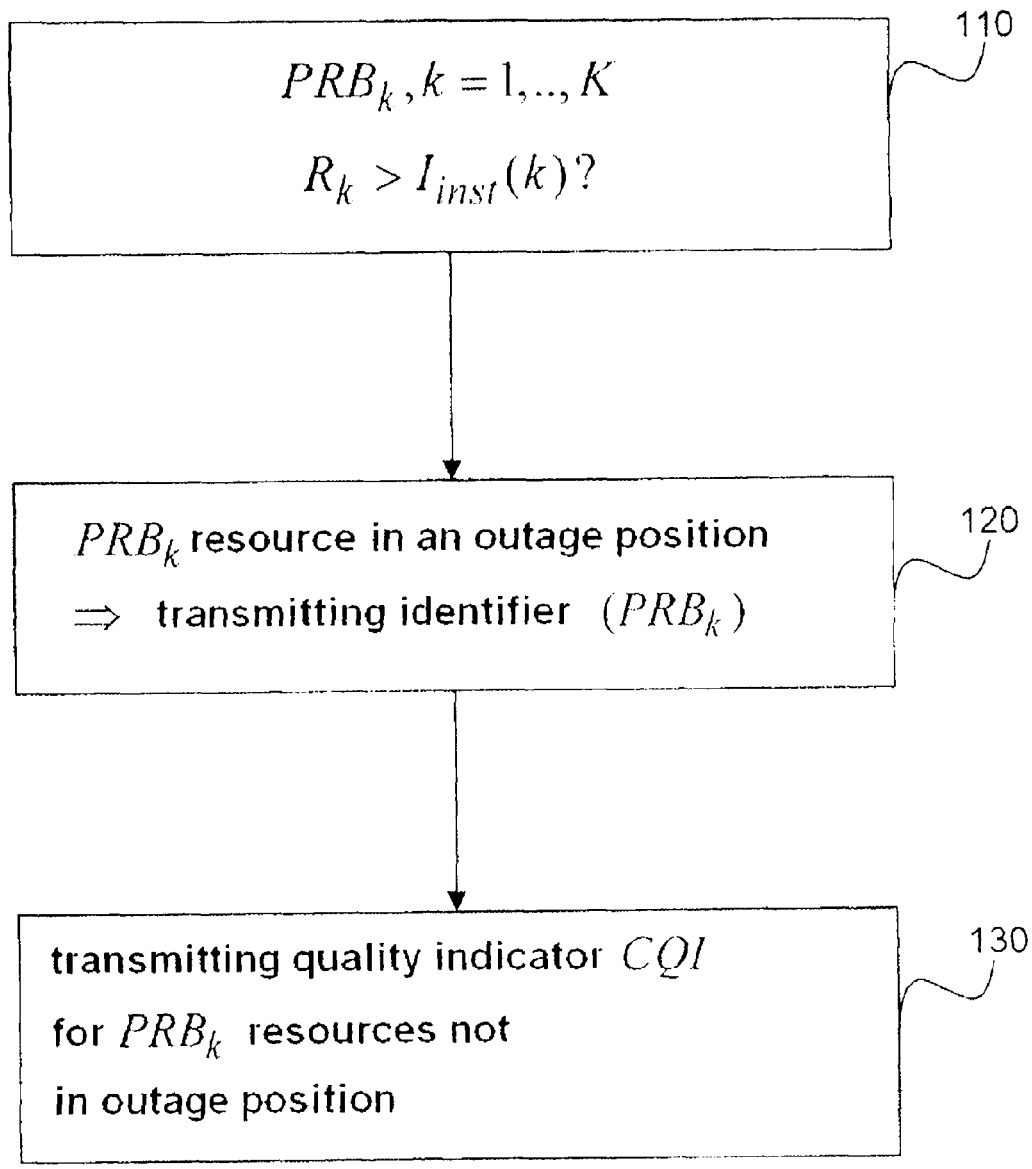
FIG. 1 illustrates the principle of the method for reporting a channel quality according to the invention.

A link adaptation wireless telecommunication system will be generally considered. Each user can have a plurality of transmission resources for example time intervals, frequency intervals, codes or a combination of the abovementioned resources. These resources are allocated to the user by a scheduling method if the system is of the multi-access type and, in this case, the scheduling can also use the quality indicator to allocate resources to a user.

The communication system may be stationary or mobile but in any case, the characteristics of channels of the different users are likely to vary over time.

The idea underlying the invention is to predict at the receiver an outage position according to the information theory. If a transmission resource is affected by an outage position, this position will be reported to the transmitter in lieu of the quality indication of this resource. Thus, it will be generally possible to reduce the number of bits of the channel indicator and accordingly the reporting traffic on the uplink.

Moreover, as will be seen below, the quality indicator component relating to the resource in an outage position will not need to be retransmitted before a predetermined time. The resource in an outage position could have its access forbidden for this user during the same time lapse and a useless transmission will thus be avoided on this resource. Similarly, in a packet retransmission system, useless retransmissions could be avoided with the proviso that a resource in an outage position will be reported to a transmitter, resulting in a decreased packet error rate and, in the case of allocating a new resource to the user during the outage time, a reduced latency on the uplink.

By way of non-limiting example, it will be assumed in the following that the telecommunication system is an OFDM system, that is the signals transmitted to users are OFDM signals. Each user may be allocated one or more frequency intervals, each interval consisting of a set of continuous subcarriers (frequency chunks), during several OFDM time-symbols to transmit a data packet.

The user channel is a radio channel. In general, a radio channel is not ergodic but can be modelled as a block fading channel. In the case of OFDM type radio transmission, a block could be defined by a time interval and a set of contiguous subcarriers. To each block corresponds one instance of the channel generally characterised by the complex value of an attenuation coefficient. Attenuation coefficients of different blocks may be considered as the results of random variable selections.

The capacity according to Shannon, expressed as the average of the mutual piece of information on all the channel instances, is not a relevant magnitude to characterise a non ergodic channel. As set out in the article of E. Biglieri et al. entitled "Fading channels: information-theoretic and communication aspects" published in *IEEE Trans. on Information Theory*, vol. 44, no 6, October 1998, pages 2619-2692, it is then preferable to characterise this channel by an outage probability. There is an outage when the capacity associated with the channel instance is lower than the transmission bit rate of the source.

The outage probability depends on the signal to noise ratio $\gamma$ and the transmission bit rate R of the source, that is:

$$P_{out}(\gamma,R)=Pr(I(X,Y)<R) \quad (6)$$

The outage probability may be considered as the probability that the "instantaneous" mutual piece of information of the channel, viewed from a packet, be lower than the transmission bit rate. If this is lower than this rate, it will not be possible to correct the errors affecting a packet. On the other hand, drawing a parallel with the Shannon's fundamental theorem, if the "instantaneous" mutual piece of information of the channel is higher than this rate, it will always be possible to use a correcting code enabling data with an arbitrarily low error probability to be transmitted.

If the case of the abovementioned OFDM system is again considered and more particularly the transmission channel of a user associated with a set of $n_c$ subcarriers and a set of $n_t$ OFDM time-symbols during a transmission interval, the "instantaneous" mutual piece of information of the channel, that is "observed" upon transmitting the packet, can be assessed by means of:

$$I_{inst} = \frac{1}{n_t n_c}\sum_{j=1}^{n_t}\sum_{i=1}^{n_c} I_{ij} \quad (7)$$

where $I_{ij}$ is the average mutual piece of information (with the meaning that it is averaged on the different possible modulation symbols) relating to the subcarrier i and at the $j^{th}$ OFDM time-symbol. The behaviour of the channel on a subcarrier can be considered, to the nearest complex attenuation coefficient, as being of the AWGN type (that is with Additive white Gaussian Noise).

It is assumed that the symbols of a data packet modulating the $n_c$ subcarriers belong to a Q-ary alphabet. The receiver knows by means of a channel estimator the complex attenuation coefficients $h_{ij}$ affecting the different subcarriers upon transmitting the $j^{th}$ OFDM time-symbol. Generally, the channel estimator estimates some complex attenuation coefficients at different time points of the transmission interval and for different subcarriers, the other coefficients being determined by time and/or frequency interpolation.

The channel estimator may conventionally make use of detection of pilot symbols distributed on the subcarriers in the frame of OFDM symbols. Alternatively, the channel estimator can be of the decision aided channel estimation type in a manner known per se.

Besides, the detection of pilot symbols enables an estimation of the noise variance $\sigma^2$ to be obtained. It can be shown that the mutual piece of information $I_{ij}$ can be then expressed by:

$$I_{ij} = \log_2 Q - \frac{1}{Q}\sum_{k=1}^{Q} E_z\left\{\log_2\left(\sum_{q=1}^{Q} \exp\left[-\frac{|h_{ij}a_k + z - h_{ij}a_q|^2 - |z|^2}{2\sigma^2}\right]\right)\right\} \quad (8)$$

where $a_q=1, \ldots, Q$ are the symbols of the modulation alphabet modulating the subcarriers during the OFDM time symbol considered, $z=N(0,\sigma^2)$ is the random variable describing the noise on the subcarrier and $E_z(.)$ is the expectation on the noise samples.

When the user link uses an HARQ type packet retransmission mechanism and a combination of the received packets at each transmission attempt (Chase combining), then it can be shown that the instantaneous mutual piece of information taken into account the future retransmission of the packet on the same set of subcarriers and the same set of OFDM time-symbols is expressed by:

$$I_{mst} = \frac{1}{n_t n_c}\sum_{j=1}^{n_t}\sum_{i=1}^{n_c} I'_{ij} \quad (9\text{-}1)$$

with $$I'_{ij} = \log_2 Q - \frac{1}{Q}\sum_{k=1}^{Q} E_{z'}\left\{\log_2\left(\sum_{q=1}^{Q} \exp\left[-\frac{|h_{ij}a_k + z' - h_{ij}a_q|^2 - |z'|^2}{\sigma^2}\right]\right)\right\} \quad (9\text{-}2)$$

where $z' = N\left(0, \frac{\sigma^2}{2}\right)$.

Those skilled in the art will understand that (9-2) is merely deduced from (8) by dividing the noise power by 2, in other words, all other things being equal, by doubling the signal to noise ratio per subcarrier.

Similarly, if the user link makes use of an incremental redundancy packet transmission mechanism, it can be shown that the instantaneous mutual piece of information taking into account the subsequent transmission of parity bits of the packet on the same set of subcarriers and the same set of OFDM time-symbol is expressed by:

$$I_{inst} = \frac{2}{n_t n_c}\sum_{j=1}^{n_t}\sum_{i=1}^{n_c} I_{ij} \quad (10)$$

where $I_{ij}$ is determined by the expression (8).

It should be noted that the expressions (9-1) and (10) assume that the transmission channel only varies weakly between the first transmission of the packet and the next retransmission.

In any case, the user can calculate the value $I_{inst}$ by means of a look-up table from the values $n_c$, $n_t$, $\sigma^2$ and $|h_{ij}|^2$, $i=1, \ldots, n_c$, $j=1, \ldots, n_t$ and compare it with the bit rate R. The user will diagnose a channel outage if the bit rate is higher than the instantaneous mutual piece of information:

$$R > I_{inst} \quad (11)$$

Since the OFDM multiplex is divided into a plurality K of frequency intervals (frequency chunks), the outage diagnosis can be carried out interval by interval or more roughly according to the reporting granularity of the channel quality. By granularity, it is meant the number $N_{SB}$ of intervals having a common quality reporting. The instantaneous mutual piece of information is then calculated on $N_{SB}$ adjacent frequency intervals and the outage diagnosis is common to these intervals.

FIG. 1 illustrates the principle of the method of reporting a channel quality according to the invention.

It is assumed that the telecommunication system includes a plurality K of transmission resources $PRB_1, \ldots, PRB_K$, for example frequency intervals of an OFDM multiplex.

The reporting of a channel quality either occurs prior to any resource allocation to the user, or after resources have been allocated to the user. The first case consists in determining the quality of different resources to their assigning to the user, the second case not only consists in monitoring the quality of already assigned resources but also resources that could be assigned to the user if the latter had an inadequate quality.

In a first step 110, for each $PRB_k$ resource, $k=1, \ldots, K$, of the system, it is determined whether it would be in an outage state for a transmission with a bit rate required by the user, also called "set point bit rate" (or more simply set point rate) in the following. To do this, first the instantaneous mutual piece of information $I_{inst}(k)$ of the resource $PRB_k$ is calculated using pilot symbols transmitted on this resource. Then, $I_{inst}(k)$ is compared with the bit rate $R_k$ required by the user. For example, the rates $R_k$ can be identical and equal to a bit rate corresponding to the quality of service (QoS) required by the user. However, the rates $R_k$ may be not identical for different types of flow (voice and data for example). According to an alternative not represented, the outage diagnosis can be carried out on a group of $N_{SB}$ resources, in which case the instantaneous mutual piece of information is calculated on this group of resources.

Then, the transmission resources which would be in an outage position are discriminated from those which would not be. For example, in step 120, on the uplink of the user, a list of respective identifiers of the transmission resources in an outage state is transmitted. In step 130, for resources not being in this situation, on the uplink a channel quality indicator is transmitted, in a conventional manner, for example by using one of the abovementioned reporting methods. The transmissions 120 and 130 can occur together using a single report or two consecutive reports, the order being indifferent. Moreover, the reporting can be made with a coarse granularity than that of the transmission resources. A group of $N_{SB}$ resources ($N_{SB} \geq 1$) can then be reported in one and same report.

Figure 2A:
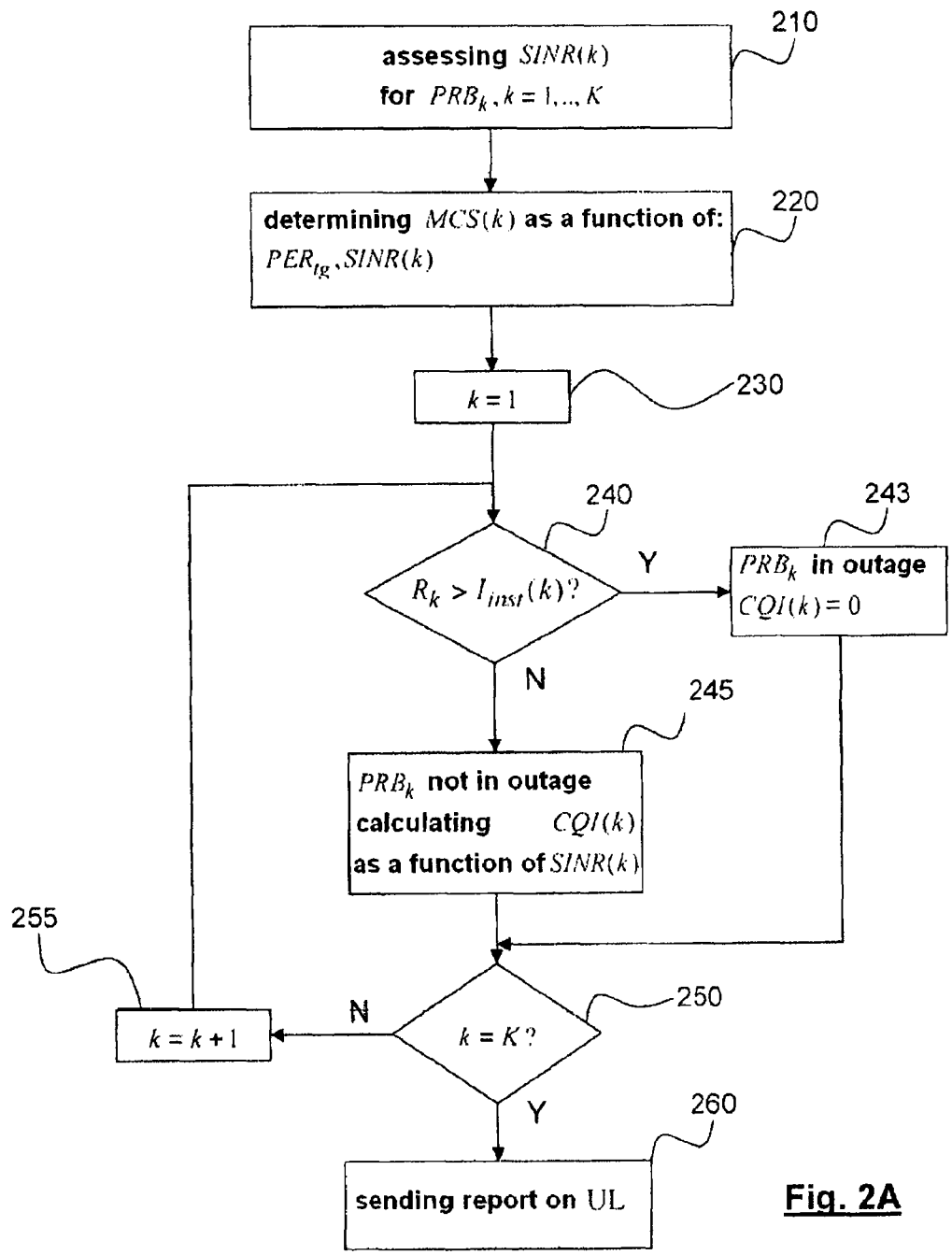
FIG. 2A schematically illustrates a method for reporting a channel quality according to a first embodiment of the invention.

FIG. 2 schematically illustrates a method for reporting a channel quality of a user according to a first embodiment of the invention.

It is assumed that the system has K transmission resources, that is for an OFDM system, K frequency intervals (frequency chunks) for a plurality of time-symbols.

In step 210, the signal to interference plus noise ratio SINR(k) is assessed for different $PRB_k$ resources, $k=1, \ldots, K$. This assessment is made using pilot symbols transmitted on the $PRB_k$ resources.

The SINR(k) ratio can be assessed by means of a linear metric such as the one given by the expression (1). The attenuation coefficients $h_{ij}$ are determined by a channel estimator and the noise variance $\sigma^2$ by the demodulator, using pilot symbols.

Alternatively, the signal to noise plus interference ration can be assessed by means of a so-called exponential effective SINR metric (EESM) such as described for example in document 3GPP TSG-RAN-1, TR 25.892, June 2004, entitled "Feasability study for OFDM for UTRAN enhancement", that is:

$$SINR(k) = -\beta \ln\left( \frac{1}{n_t n_c} \sum_{j=1}^{n_t} \sum_{i=1}^{n_c} \exp\left(-\frac{\gamma_{ij}}{\beta}\right) \right) \quad (12)$$

where $\beta$ is a parameter only depending on the MCS scheme used during the measurement, that is the one of the transmitted pilot symbols and where, it is reminded that $\gamma_{ij}$ is the signal to interference plus noise ratio measured per subcarrier.

In step 220, for each transmission resource $PRB_k$, a modulation and coding scheme MCS(k) is selected, enabling not to exceed a level of predetermined packet error rate $PER_{tg}$, given the measured signal to interference plus noise ratio SINR(k). Preferably, the MCS(k) scheme will be the one with the highest rate, that is with the greatest spectral efficiency, meeting the abovementioned constraint. The set point level $PER_{tg}$ is a function of the quality of service required on the link. There is obtained a vector MCS with a size K the components of which are for example indices identifying the different modulation and coding schemes thus selected.

In step 230, the resource counter is set, that is k=1, and then an iteration loop is initiated.

In step 240, for the $PRB_k$ resource, the binary rate $R_k$ given by the MCS(k) scheme, is compared with the instantaneous mutual piece of information $I_{inst}(k)$ relating to the same resource. This instantaneous mutual piece of information can be assessed using the expression (7), (9-1) or (10) depending on the link adaptation type considered. It will be understood that since the assessment is carried out for the resource and not for the channel, the summation present in these expression relates to the set of subcarriers on the resource.

In 243, if $R_k > I_{inst}(k)$, the resource cannot support the bit rate required by the user. This outage position is coded, for example by means of a null value CQI(k)=0.

In 245, if $R_k \leq I_{inst}(k)$, the resource can support the bit rate. Then, the component of the quality indicator CQI(k) is determined for this resource as a function of the signal to interference plus noise ratio SINR(k). For example, the quality indicator could be merely obtained by quantizing SINR(k) such as the one given by the expression (2).

In 250, it is checked whether all the resources are exhausted, that is k=K. If so, it is proceeded to step 260, otherwise k is implemented in 255 and the process returns to step 240.

In step 260, the outage position is reported for resources being in this state and the channel quality indicator is transmitted for the others. The number of resources in an outage position will be noted $M_O$.

According to a comprehensive reported method, for resources not in an outage position, the value calculated in step 245 or directly the index of the MCS(k) scheme the transmitter could use for the transmission is transmitted. For resources in an outage position, the list of identifiers of these resources is transmitted. For example, in the case of an OFDM system, the resource identifier could be the position of the frequency interval. This list could be preceded by a common attribute, for example, the value CQI(k)=0 indicating the outage state.

According to a first "Top-M individual reporting" type abbreviated reporting method, the K−M₀ components CQI(k) of the resources not in an outage position are classified. Out of them, the M components having the highest values are selected and then these components are transmitted individually (that is with their respective identifiers) to the transmitter. Alternatively, the indices MCS(k) of corresponding modulation and coding schemes are directly transmitted to the transmitter. The K−M−M₀ remaining resources not in an outage position are collectively coded as an average (rounded), $\mu_{low}$ of their components CQI(k) or even by the index of the MCS scheme corresponding to this average value. More precisely, the MCS scheme is determined from the average value $\mu_{low}$ according to the same process as step 220. Finally, the identifiers of the M₀ resources in an outage state are also coded and transmitted to the transmitter.

According to a second "Top-M average reporting" type abbreviated reporting method, the process is the same as for the first abbreviated reporting method with the difference that the M best resources, in terms of the highest CQI(k) values, are collectively coded as an average value $\mu_{high}$. Alternatively, they could be collectively coded by the index of the MCS scheme corresponding to this average value.

According to a third "Threshold based reporting" type abbreviated reporting method, the resources not in an outage position are selected the components of which have values such that CQI(k)>CQI$_{max}$−η (in dB) where $$CQI_{max} = \max_k CQI(k)$$

and η is a threshold value. Thus selected components are transmitted as a first average value $\mu_{high}$. The non-selected components are transmitted as a second average value $\mu_{low}$. Alternatively, the indices of the MCS schemes corresponding to the average values $\mu_{low}$ and $\mu_{high}$ are transmitted to the transmitter. Finally, the identifiers of the M₀ resources in an outage state are also transmitted.

For all the resources in an outage state, it will be sufficient for example to transmit the list of identifiers of the considered resources preceded by an outage indication (CQI=0) or even if these resources are consecutive (for example consecutive frequency intervals), the respective identifiers the first and last ones of these resources preceded by said outage indication. Hence, it will not be necessary to transmit for them the SINR quantized values on the uplink. Moreover, the list of resources in an outage state may be refreshed with a period equal to or higher than the channel coherence time, $T_{coh}$, that is at a frequency lower than that for transmitting the channel quality indicator. Thus, the reporting traffic on the uplink will be further reduced.

Figure 2B:
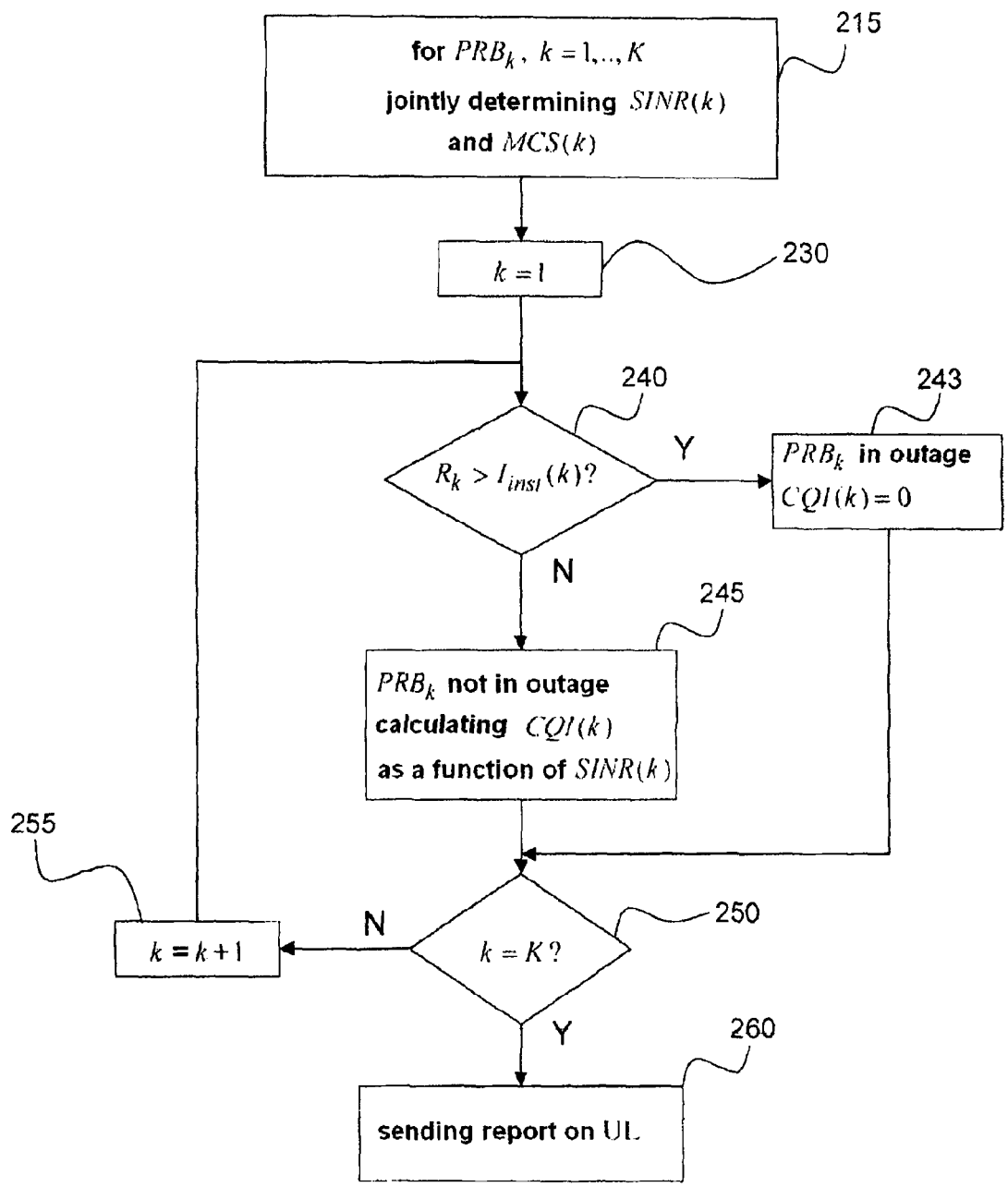
FIG. 2B schematically illustrates a method for reporting a channel quality according to a variant of the first embodiment.

According to a variant of the first embodiment represented in FIG. 2B, instead of successively determining the SINR(k) report and then the MCS(k) scheme, respectively in 210 and 220, the modulation and coding scheme MCS(k) as well as the signal to interference plus noise ratio SINR(k) compatible with the set point level PER$_{tg}$ are jointly determined in 215 from expression (12).

A PRB$_k$ resource, k=1, . . . , K is herein considered.

Let MCS₀, . . . , MCS$_{N-1}$ be the modulation and coding schemes classified by increasing spectral efficiency (and hence by decreasing robustness to noise) and β₀, . . . , β$_{N-1}$ be the parameters β respectively associated to the aforementioned schemes.

For a given set point PER$_{tg}$, it may be determined for each MCS$_n$ scheme, n=0, . . . , N−1, for example by means of a look-up table, the minimum signal to interference plus noise ratio SINR$_n^{th}$ such that the set point packet error rate PER$_{tg}$ is met.

Figure 2C:
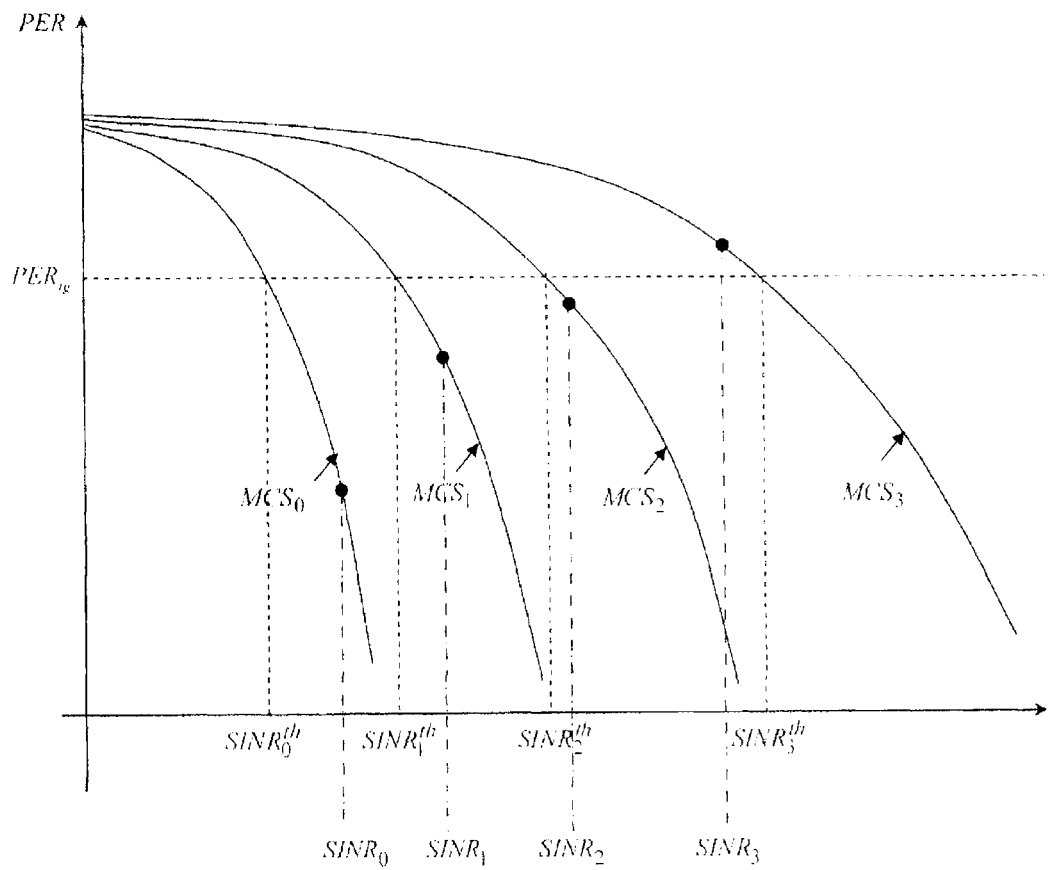
FIG. 2C represents different packet error rate curves for different modulation and coding schemes.

FIG. 2C shows the packet error rate PER curves for different MCS$_n$ schemes. From the set point value PER$_{tg}$, the minimum ratios SINR$_n^{th}$ can be graphically deduced.

Then, from the ratios $\gamma_{ij}$ and the expression (12), the following values are calculated:

$$SINR_n = -\beta_n \ln\left(\frac{1}{n_t n_c} \sum_{j=1}^{n_t} \sum_{i=1}^{n_c} \exp\left(-\frac{\gamma_{ij}}{\beta_n}\right)\right) \quad (13)$$

for $n = 0, \ldots, N-1$ and for each of these values, it is determined if:

$$SINR_n > SINR_n^{th} \quad (14)$$

Then, the MCS$_{n0}$ where n₀ the highest index is selected such that the inequality (14) is well confirmed. FIG. 2C shows the different SINR$_n$ values and the SINR$_{n0}$ value. In the example illustrated, n₀=2.

The MCS(k) scheme of the PRB$_k$ resource is then given by MCS$_{n0}$.

Figure 3:
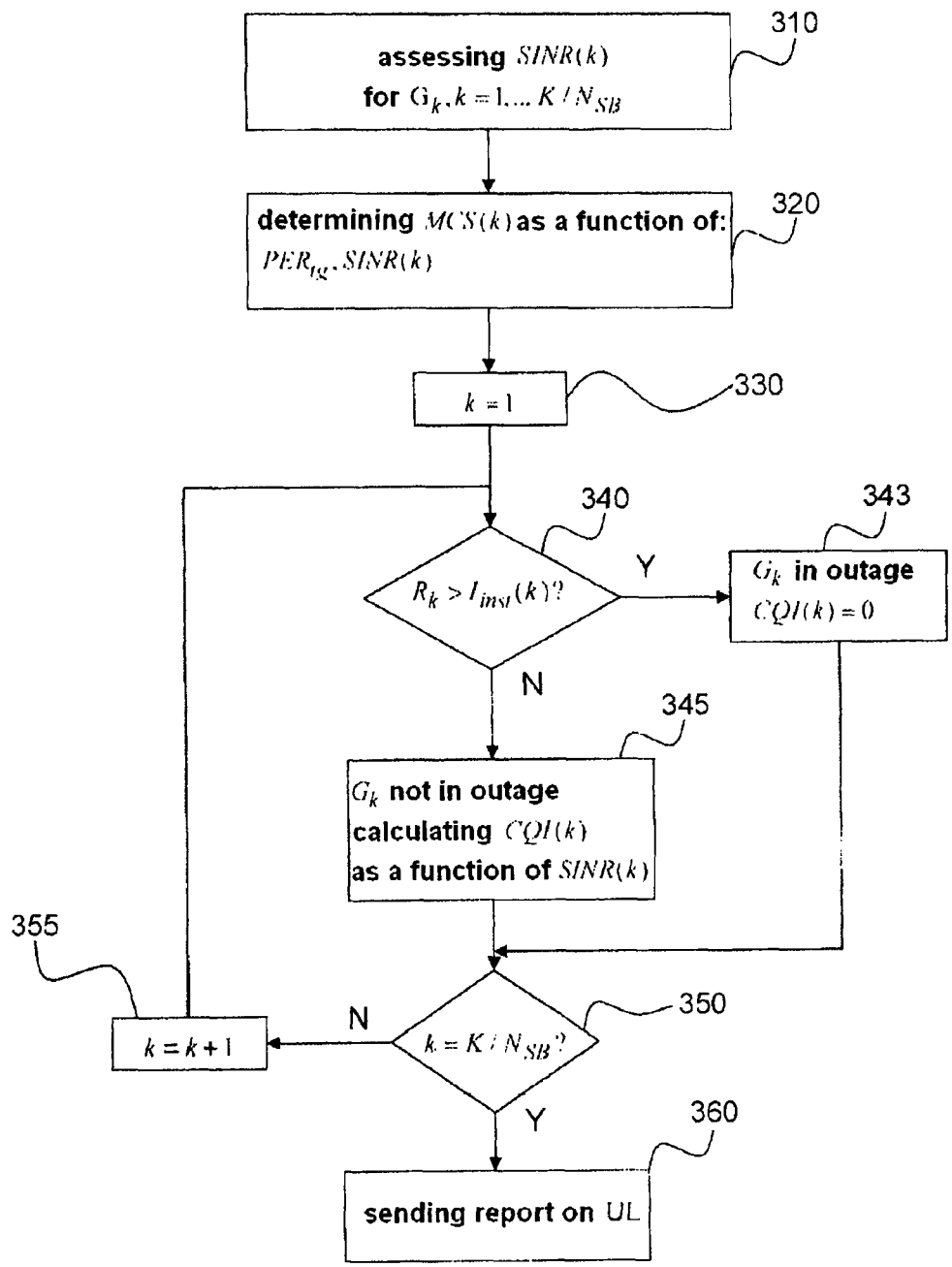
FIG. 3 schematically illustrates a method for reporting a channel quality according to a second embodiment of the invention.

FIG. 3 schematically illustrates a method for reporting a user channel quality according to a second embodiment of the invention.

This second embodiment is different from the previous one in that the reporting is carried out by groups of resources. It is assumed herein that the transmission resources are divided into groups, each group consisting of N$_{SB}$ resources. It will be noted that the particular case where N$_{SB}$=1 corresponds to the already described first embodiment.

In step 310, the signal to interference plus noise ratio SINR(k) is assessed for each group of resources G$_k$, k=1, . . . , K/N$_{SB}$. This assessment is performed as before from pilot symbols, using a linear or EESM type metric. The corresponding summations in the expressions (1) and (12) then relate to all the subcarriers of the group of resources considered.

In step 320, for each G$_k$ group a modulation and coding scheme is selected, MCS(k), enabling not to exceed a predetermined level of packet error rate PER$_{tg}$, given the measured signal to interference plus noise ratio SINR(k).

In step 330, the group counter is set, that is k=1, and then an iteration group is initiated.

In step 340, for the group G$_k$, the set point bit rate R$_k$, given by the MCS(k) scheme, is compared with the instantaneous mutual piece of information I$_{inst}$(k) relating to the same group. The instantaneous mutual piece of information is assessed using one of the expressions (7), (9-1) or (10) wherein the summations relate to all the subcarriers of the considered group.

Steps 343 and 345, depending on the comparison result, are similar to the aforementioned steps 243 and 245.

In 350, whether all the groups are exhausted, that is k=K/$N_{SB}$ is checked. If so, it is proceeded to step 360, otherwise k is incremented in 355 and the process returns to step 340.

In step 360, the outage position is reported for the groups of resources in this state and a channel quality indicator is transmitted for other groups. The use of comprehensive and abbreviated methods will not be repeated here. It will be merely noted that the channel quality indicator has K/$N_{SB}$ components associated with the different groups. If the comprehensive reporting method transmits all of them, the first abbreviated reporting method only transmits individually the M highest components, the K/$N_{SB}$−M−$M_0$ remaining components being transmitted as an average. The identifiers of the $M_0$ groups in an outage state are also transmitted to the transmitter.

It will be understood that the alternative represented in FIG. 2B can also be applied to the second embodiment, only the joint determination relating here to each group of resources $G_k$ instead of each resource $PRB_k$.

If the telecommunication system is of the HARQ type, it is possible to reduce useless traffic on the downlink with the present invention. Indeed, if any transmission on the resource of the group of resources in the outage state is forbidden for a predetermined duration equal to or higher than the channel coherence time, noted $T_{coh}$, packet transmissions or retransmissions which would surely deemed to fail will be avoided. Thus, the retransmission rate is dramatically reduced and the average throughput of users can be correlatively higher.

It is reminded that the channel coherence time $T_{coh}$ can be obtained in different ways. For example, it can be estimated from the Doppler $f_d$ experienced by the radio signal by means of:

$$T_{coh} = \frac{1}{\pi\sqrt{2}\, f_d} \quad (15)$$

The Doppler shift could be obtained as set out in the article of N. Maeda et al. entitled "Experimental Evaluation of Throughput Performance in Packet Wireless Access Based on VSF-OFDM and VSF-CDMA", IEEE PIRMC '03, that is from a correlation between pilot symbols of a same carrier belonging to consecutive OFDM symbols. Alternatively, the coherence time could be obtained from the cyclic correlation function of the OFDM signal received on the transmission channel (uplink or downlink). In the case where the transmission channel is of the FDD (Frequency Division Duplex) type, that is if the uplink and downlink use different carrier frequencies, the Doppler shift of the one will be merely deduced from the Doppler shift of the other.

According to one alternative, the transmission prohibition will last for a time equal to or higher than the transmitter scheduling period, that is the period with which it can reallocate transmission resources to the user.

Finally, instead of prohibiting the user from using a resource in an outage position, in order to transmit or retransmit a packet, a more robust modulation and coding scheme could be selected at the expense of a spectral efficiency loss.

The present invention has in particular been described in the particular case of a SISO (Single Input Single Output) type OFDM channel. It will be understood that it can also be applied to a MIMO (Multiple Input Multiple Output) system. In this case, the attenuation coefficients $h_{ij}$ are to be replaced by matrices $H_j$ of a size P×Q where P and Q are the number of antennas of the transmitter and the number of antennas of the receiver respectively. In that case, the user channel has spatial resources which can be combined with frequency, time or access code resources. Thus, some resources associated with a unit channel between a transmission antenna and a reception antenna could be in an outage position whereas others associated with a unit channel could not be. It will be understood, for example, that a group of subcarriers could be in an outage position for a unit channel and not for another.

The invention claimed is:

1. A method for reporting user channel quality in a link adaptation wireless telecommunication system, the method comprising:
   for each group of resources of a plurality of groups of transmission resources, determining whether each group would be in an outage position for a bit rate required by the user, the bit rate required by the user being a set point bit rate, and a group of resources being considered in the outage position if instantaneous mutual information on the group of resources is lower than the set point bit rate; and
   transmitting a list of identifiers of groups of resources which would be in the outage position as well as a channel quality indicator for the groups of resources which would not be on an uplink of the user, wherein
   the channel is not ergodic and is a block fading type, and
   each group of transmission resources includes at least one transmission resource.

2. The reporting method according to claim 1, wherein the set point bit rate for the group of resources is determined from a modulation and coding scheme able to meet a set point packet error rate in presence of a signal to interference plus noise ratio estimated for the group of resources.

3. The reporting method according to claim 1, wherein the set point bit rate for the group of resources is determined from a modulation and coding scheme, the scheme and a signal to interference plus noise ratio being determined together so as to meet a set point packet error rate.

4. The reporting method according to claim 1, wherein a coherence time of the channel is determined, and the list of identifiers of the groups of resources in the outage position is transmitted on the uplink with a period of time equal to or higher than the coherence time.

5. The reporting method according to claim 1, wherein a signal to interference plus noise ratio is assessed for each group of resources, and the channel quality indicator comprises quantized values of the signal to interference plus noise ratios relating to the groups of resources which are not the outage position.

6. The reporting method according to claim 1, wherein a signal to interference plus noise ratio is assessed for each group of resources, the ratios are quantized, and the quantized ratios relating to the groups of resources not being in the outage position are classified depending on their values, the channel quality indicator comprising a predetermined number of quantized ratios having highest values and an average of remaining values.

7. The reporting method according to claim 1, wherein a signal to interference plus noise ratio is assessed for each group of resources, the ratios are quantized, and the quantized ratios relating to the groups of resources not being in the outage position are classified depending on their values, the channel quality indicator comprising a first average calculated on a predetermined number of highest values and a second average calculated on remaining values.

8. The reporting method according to claim 1, wherein a signal to interference plus noise ratio is assessed for each group of resources, the ratios are quantized, and the quantized ratios relating to the groups of resources not being in the outage position are classified depending on their values, a first average is calculated on values included in an interval having an upper bound of a highest value and a lower bound which is the highest value minus a predetermined margin, a second average is calculated on remaining values, the channel quality indicator including the first and second averages.

9. The reporting method according to claim 1, wherein when a transmitter on the channel receives, via the user uplink, the identifiers of the groups of resources in the outage position, the transmitter does not transmit on the groups of resources in the outage position during a time equal to or higher than a coherence time of the channel.

10. The reporting method according to claim 1, wherein when a transmitter on the channel receives, via the user uplink, the identifiers of the groups of resources in the outage position, the transmitter does not transmit on the groups of resources in the outage position during a time equal to or higher than a scheduling period of time for system resources.

11. The reporting method according to claim 1, wherein the telecommunication system is an Orthogonal Frequency Division Multi-Access (OFDM) system and the transmission resources are frequency intervals of the OFDM multiplex.

12. The reporting method according to claim 11, wherein an instantaneous mutual piece of information of a frequency interval is obtained as an average of the mutual information on subcarriers of the interval.

13. The reporting method according to claim 11, wherein the telecommunication system is an incremental redundancy transmission packet telecommunication system and an instantaneous mutual piece of information from two consecutive transmissions on a frequency interval is obtained as twice an average of the mutual information on subcarriers of the interval.

14. The reporting method according to claim 11, wherein the telecommunication system is a HARQ type packet transmission system, wherein a packet is retransmitted if a received packet is erroneous, two packets from two consecutive transmissions being combined, instantaneous mutual information of a frequency interval is estimated as an average of the mutual information on subcarriers of the interval, wherein noise power is divided by 2 with respect to a single transmission.

* * * * *